Figure 1:
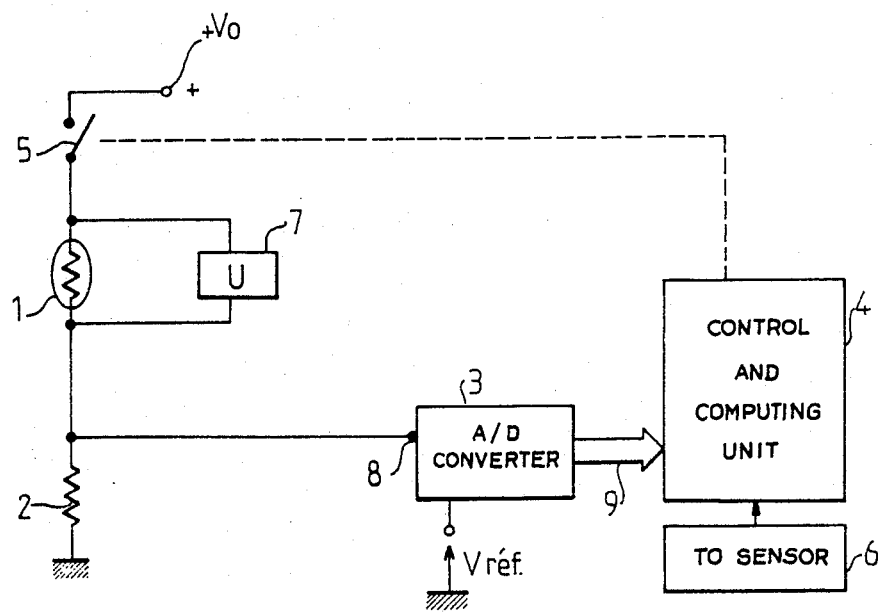

United States Patent [19]
Ory

[11] Patent Number: 4,825,383
[45] Date of Patent: Apr. 25, 1989

[54] PROCESS AND DEVICE FOR MEASURING THE LEVEL OF THE FREE SURFACE OF A LIQUID

[75] Inventor: Philippe Ory, Ittenheim, France

[73] Assignee: Bendix Electronics S.A., Toulouse, France

[21] Appl. No.: 52,661

[22] Filed: May 20, 1987

[30] Foreign Application Priority Data

Jun. 4, 1986 [FR] France ............... 86 08056

[51] Int. Cl.⁴ .............................. G01F 23/24
[52] U.S. Cl. ..................... 364/509; 364/571.01; 73/295
[58] Field of Search ......... 364/509, 571, 562; 73/295, 304 R; 340/622

[56] References Cited

U.S. PATENT DOCUMENTS

| | | | |
|---|---|---|---|
| 4,163,391 | 8/1979 | Bezard et al. | 73/304 R |
| 4,218,746 | 8/1980 | Koshiishz | 364/571 |
| 4,326,199 | 4/1982 | Tarpley et al. | 73/295 |
| 4,416,153 | 11/1983 | Williams | 364/571 |
| 4,489,601 | 12/1984 | Rao et al. | 73/304 R |
| 4,513,616 | 4/1985 | Bezard et al. | 73/295 |
| 4,609,913 | 9/1986 | Arbogast et al. | 340/622 |
| 4,633,491 | 12/1986 | Kuhnel | 377/20 |
| 4,640,127 | 2/1987 | Schneider | 73/295 |

Primary Examiner—Parshotam S. Lall
Assistant Examiner—Ellis B. Ramirez
Attorney, Agent, or Firm—Russel C. Wells

[57] ABSTRACT

The invention belongs to the field of dimensional metrology. The process according to the invention makes use of a hot wire sensor (1) passing through the free surface of the liquid. The wire is heated by a joule effect up to a temperature To. The supply to the wire is then interrupted for a predetermined time interval $\tau$. The current passing through the wire at the two instants forming the bounds of this interval is determined by means of an A/D converter (3) which feeds a control and computing unit (4). From these current measurements this unit derives a value which represents the liquid level.

15 Claims, 2 Drawing Sheets

PROCESS AND DEVICE FOR MEASURING THE LEVEL OF THE FREE SURFACE OF A LIQUID

The present invention relates to a process and a device for measuring the level of the free surface of a liquid contained in a storage vessel and, more particularly, to a process of this kind and to a device of this kind which are based on the principle of the hot wire sensor.

A sensor of this kind consists of a metal wire whose resistance changes greatly with the temperature. An electrical current which flows through the wire causes it to heat and, consequently, produces an increase in its electrical resistance. If the wire is then partly immersed in a liquid which has a thermal conductivity coefficient different from that of the medium present above the free surface of the liquid (for example, air at ambient temperature), the cooling of the wire will be a function of the level of that free surface. It follows from this that the temperature of the wire, and hence its resistance, are related to this level. The latter can then be deduced from a measurement of electrical resistance.

French Pat. No. 2,367,276 describes a device for detecting the level of a liquid, which comprises a hot wire sensor. The sensor wire is supplied with a constant current for a predetermined period of time and the liquid level is detected from the difference in the voltages at the wire terminals, measured at the beginning and at the end of the heating respectively. The disadvantage of this device is that it requires a source of current whose constancy must be accurately ensured, and this is difficult to implement over a wide temperature range. In addition, because of the analog nature of the signals processed in the device, it is difficult to provide a correction as a function of ambient temperature, which depends on a square relationship to the cold resistance of the sensor wire.

French Pat. No. 2,514,497 describes various embodiments of hot-wire level detectors equipped with digital means of measurement, which are aimed at improving the accuracy of the detection. With some embodiments the detection is performed by relying on a difference in voltages or currents measured in absolute values at the terminals of the sensor, before and after heating. Other embodiments enable the level to be deduced from a mathematical formula where the variable is the resistance of the wire, calculated from a simultaneous measurement of the voltage and of the current at the sensor terminals, before and after heating.

Devices which rely on the measurement of a difference in voltages or in currents, in absolute terms, require the use of an accurate analog-digital converter, with an accurate reference voltage because of the low value of this difference, compared with the electrical quantities measured. In addition, the dynamics of the converter input voltage are tricky to determine because the voltages to be measured change greatly with the ambient temperature, and the sensitivity is low.

Furthermore, simultaneous measurement of the voltage and of the current at the terminals of the sensor is difficult to implement in some applications. For example, in the case of the measurement of the level of liquids, petrol, oil, and the like, which are loaded into a motor vehicle, the supply to the electrical measuring devices is provided only by the battery. The body of the vehicle serves as a reference voltage, which is, unfortunately, liable to fluctuate with time. As a result of this, when use is made of an electrical measuring device equipped with digital means and hence with an analog-digital converter, it is not possible to read off two voltages by referring them simultaneously to the body. To overcome this disadvantage it then becomes necessary to make use of complex, and hence costly, means of correction.

The objective of the present invention is accordingly to provide a process for measuring the level of the free surface of a liquid contained in a storage vessel, which does not have the disadvantages described above and which are encountered in the prior art.

Another objective of the present invention is to provide a device for implementing this process, comprising a source of constant voltage which is less costly to implement and more accurate than a source of constant current.

Yet another objective of the present invention is to provide a measuring device of this kind, with improved sensitivity and accuracy.

According to the present invention there is provided a process for measuring the level of the free surface of a liquid contained in a storage vessel and having a thermal conductivity which is different from that of the medium situated above this free surface, by means of a hot wire sensor whose electrical resistance varies greatly with the temperature, this sensor being arranged so as to be cooled by the liquid to a greater or lesser degree as a function of the level of its free surface, characterized in that (a) the sensor is heated to a temperature To by a Joule effect by being supplied at a constant voltage, (b) the current Io flowing in the sensor wire at the instant when the temperature To is reached is measured and the supply to the sensor is cut at this instant, (c) the constant voltage supply to the sensor wire is restored at the end of a predetermined time interval T measured from the instant of the cut in supply, in order to determine the current I flowing in the sensor wire at the end of this time interval, and (d) the level of the liquid is computed from the values of I and Io.

To implement this process, according to the invention there is provided a device comprising a hot wire sensor supplied by a voltage source and a circuit for stabilizing the voltage at the terminals of the sensor wire. According to the invention, this device comprises a control and computing unit equipped with a first means for controlling the preheating of the sensor wire by a Joule effect up to a temperature To, for cutting the supply to the sensor at the instant when this temperature is reached, and for restoring this supply at the end of a predetermined cooling time interval, a second means for measuring a parameter which is a function of the current flowing in the sensor wire at the two instants forming the bounds of the cooling time interval and means for computing which are sensitive to these measurements for deducing therefrom the level of the liquid.

Figure 2:
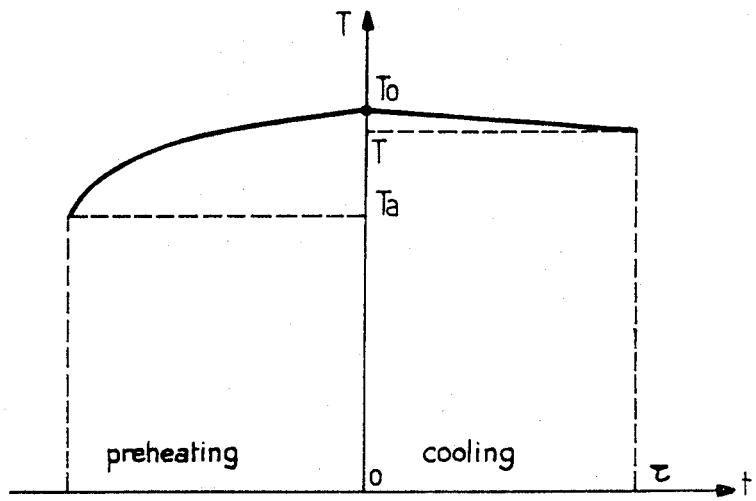
Figure 3:
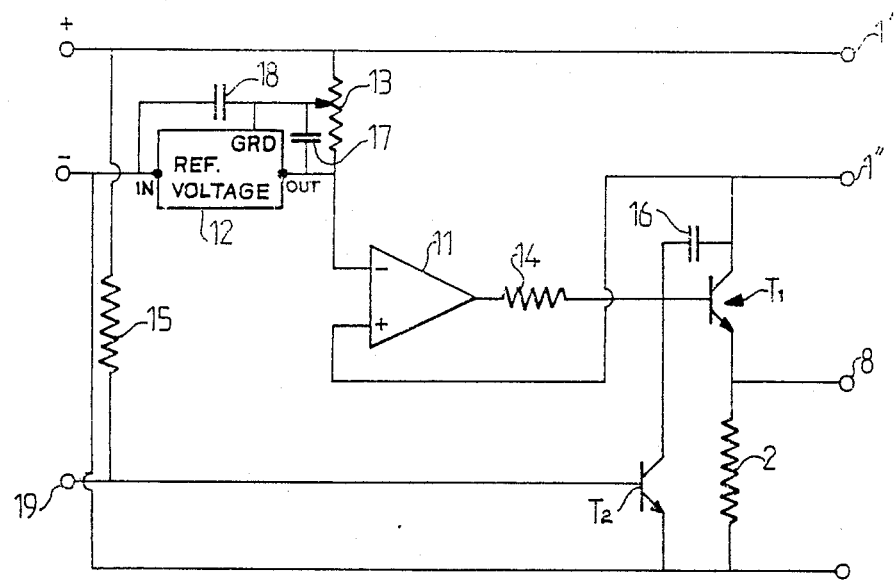

The invention will now be described by way of example with reference to the accompanying drawings in which:

FIG. 1 shows diagrammatically the organization of a device for implementing the measurement process according to the invention, and FIG. 2 is a time diagram which is useful for the understanding of the functioning of the process according to the invention, and FIG. 3 shows the wiring diagram of an embodiment of an electronic circuit forming part of the device according to the invention.

Reference is made to FIG. 1 of the drawing, from which it is apparent that the device according to the invention comprises a hot-wire level-sensor (1) connected, on the one hand, to a source of continuous voltage (+Vo) and, on the other hand, to a resistor (2) whose other terminal is earthed. The point which is common to the sensor (1) and to the resistor (2) is connected to the input of an analog-digital converter (3) whose output (9) feeds a control and computing unit (4). The converter (3) uses as reference a voltage $V_{ref}$ which may be the body of the system equipped with the measuring device according to the invention.

The wire of the sensor is immersed in the liquid whose level is to be measured, in the vicinity of the liquid's free surface. Preferably, the wire is placed in a position which is inclined in relation to this free surface, to increase the sensitivity of measurement.

If the liquid is electrically conductive, then the sensor wire must, in addition, be insulated electrically.

A switch (5), controlled by the control unit (4) enables a voltage to be applied selectively to the device according to the invention.

The latter also comprises a detector (6) of ambient temperature or of liquid temperature. According to an embodiment of the invention, this detector consists of a thermistor with a high temperature coefficient, placed in series with a fixed resistor of known value.

In some applications where the ambient temperature, and hence that of the liquid being monitored, changes little, the detector (6) is not necessary and may be omitted.

According to the invention, the voltage supply to the sensor wire (1) is maintained at a constant value $v$, by means of a voltage-stabilizing circuit (7) connected to the wire terminals. The advantage of this arrangement will become apparent hereinafter.

The analog-digital converter input (8) is connected to the common point of the resistor (2) and of the sensor (1). Thus, the converter reads off the voltage V at the terminals of this resistor, the voltage being proportional to the intensity of the current flowing through the sensor as a result of the constancy of the voltage $v$. The output signal of the converter (3) is a number M, which is proportional to $V/V_{ref}$. This output signal feeds the control and computing unit (4). The latter comprises several means which fulfil several functions: sequential control of the switch (5), reading of the converter (3), reading of the ambient temperature determined by the detector (6), memory storage of the measurements performed by the converter, timing and performing various arithmetical operations. In practice, a suitably programmed microprocessor is employed to act as the control unit (4). The microprocessor referred to as 6805 R2 in the catalogues of the Motorola Company is particularly suitable for the present application, because it incorporates inputs for acquiring analog signals, and this makes it possible to do without a separate analog-digital converter.

The process of measurement according to the invention will now be illustrated by the description of the operating sequence of the device described above.

In order to perform a measurement of the level of liquid which partly wets the sensor (1), the control unit (4) commences by measuring the ambient temperature Ta (see FIG. 2) indicated by the detector (6). As already seen, this step may be optional.

The unit (4) then orders the switch (5) to close, to produce a preheating of the sensor wire by a Joule effect. The sensor (1) is then supplied with a constant voltage $v$, by virtue of the voltage stabilizer (7). The unit monitors the intensity of the current flowing in the sensor by reading off the voltage at the terminals of the resistor (2).

As soon as this intensity drops below a predetermined value Io corresponding to a value Mo of the number supplied by the analog-digital converter (3), (which means that the temperature of the sensor (1) has reached a predetermined value To), the unit (4) orders the switch (5) to open and triggers a time-counter circuit (instant t=0, FIG. 2).

After a predetermined time interval $\tau$, the unit (4) reads off the value M of the number supplied by the converter (3), and this requires the switch (5) to close for the brief moment required for the measurement, this temporary closure obviously being controlled by the control unit (4). The value M corresponds to the flow of a current I in the sensor wire.

$\tau$ is chosen taking into account the thermal time constant of the sensor (1), $\tau$ being sufficiently large to enable the sensor to reach its thermal equilibrium.

The unit (4) then computes the level of the liquid from the values Mo and M and, if appropriate, from the ambient temperature Ta. The basis and the stages of the computation are given in detail below.

During a time interval dt of the sensor's cooling period, the quantity of heat dQ exchanged with the surroundings is:

$$dQ = K(T-Ta)\cdot dt = -Mcdt \quad (1)$$

T being the instantaneous temperature of the sensor,
Ta the ambient temperature,
K the heat convection coefficient of the sensor, which is a function of the level of liquid, and
Mc, the specific heat of the sensor, which is constant.
Relationship (1) leads to:

$$-\frac{K}{Mc}\cdot dt = \frac{dT}{T-Ta} \quad (2)$$

Integration between the instants t=0 and t=$\tau$ gives:

$$-\frac{K}{Mc}\cdot \tau = \log \frac{T-Ta}{To-Ta} \quad (3)$$

that is, $$\exp\left(-\frac{K}{Mc}\cdot \tau\right) = \frac{T-Ta}{To-Ta} = 1 - \frac{To-T}{To-Ta} \quad (4)$$

Since the coefficient K represents the level of the liquid, the unit (4) computes the expression $1-(To-T)/(To-Ta)$ to obtain a measurement of this level.

To do this, M is first expressed as:

$$M = R_2 \times \frac{v}{kT} \quad (5)$$

where:

$R_2$ is the impedance of the resistor (2), $v$ the constant voltage established at the terminals of the sensor (1), $R = kT$, the resistance of the sensor, taken as being proportional to its temperature $T$.

Under these conditions, the term $(T_o - T)$ in expression (4) can be calculated from the values $M_o$ and $M$ determined by the computing unit at the instants $t = 0$ and $t = \tau$, respectively, $$\frac{1}{T_o}(T_o - T) = 1 - \frac{M_o}{M} \qquad (6)$$

The correction term $1/(T_o - T_a)$ may be taken as a constant if the ambient temperature $T_a$ varies little, since $T_o$ is a constant.

If the ambient temperature varies appreciably, this correction time is taken into account by the control unit (4) which receives a measurement of $T_a$ by the detector (6). The term $1/(T_o - T_a)$ may be tabulated as a function of $T_a$ and stored in a memory of the control unit (4).

When the term representing the level has thus been computed by the unit (4), the latter deduces the level itself, using the sensor response curve, which is tabulated and stored in a memory in the unit (4) to give the liquid level as a function of $M_o/M$.

Various corrections can then be applied as a function of the parameters of the system equipped with the device for measuring the level of a liquid according to the present invention.

Reference is now made to FIG. 3 which shows the wiring diagram of a circuit forming part of the device according to the invention, whose general organization is shown in FIG. 1. The purpose of this circuit is to control the constant voltage supply to the sensor (1) and to switch this supply on or off, as commanded by the unit (4). It functions, therefore, as the switch (5) and the block (7) of FIG. 1.

The circuit essentially comprises an operational amplifier (11) which compares a reference voltage received at its negative input with the voltage which exists at the terminals (1',1") of the sensor (1), which is received at its positive input. The output of the operational amplifier (11) is fed, via a resistor (14), to the base of a transistor ($T_1$) which controls the current flowing in the sensor (1) and the resistor (2), from whose terminals the analog/digital converter (3) reads off an input voltage, as already seen. The voltage in the probe is thus brought under the control of the reference voltage on the negative terminal of the amplifier (11).

The reference voltage fed to the negative input of the amplifier (11) is obtained by means of a circuit (12) associated with a divider bridge (13). As an example, this circuit (12) may consist of the integrated circuit reference LM 7905 in the catalogues of the Motorola Company, with negative input and with its "GRD" output connected to the divider bridge (13). Capacitors (16, 17, 18) are added to the circuit to improve the stability of the voltages. Many other voltage reference circuits could, of course, be substituted for that described above, these circuits and their installation being well known to the specialist.

The circuit in FIG. 3 also controls the flow of the current in the sensor (1) by virtue of the transistors ($T_1$) and ($T_2$), both of the m-p-n type, the base (19) of $T_2$ being supplied with a signal originating from the control and computation unit (4). The transistors ($T_1$, $T_2$) thus act as the switch (5) in FIG. 1.

Thus, when the unit (4) detects that the current in the sensor is such that the latter reaches the temperature $T_o$, (number $M_o$ at the converter 3 output), a signal transmitted by the unit (4) to the base (19) of the transistor ($T_2$) causes the latter to conduct, the base (19) being suitably polarized by a resistor (15). The collector of the transistor ($T_2$) is connected to the base of the transistor ($T_1$) which is then locked to cut the flow of current between the terminals (1',1") of the sensor (1), and this marks the start of the cooling period.

At the end of the predetermined time interval $\tau$ the control unit (4) locks the transistor ($T_2$), and this unlocks ($T_1$) to enable the analog-digital converter (3), connected at 8, to perform the measurement of the number $M$, as seen earlier. The control unit then deduces the liquid level from the measured values $M_o, M$ and from the sensor response curve which gives the level as a function of $M_o/M$.

This response curve is tabulated and stored in a memory in the control unit. If, for a given sensor, the response curve which gives the liquid level as a function of $M_o/M$ shows satisfactory linearity, then, of course, the response of the sensor can be taken into account, which is simpler.

Thus, in contrast to the measuring devices of the prior art such as described in the preamble to this description, the liquid level is obtained from measurements performed during a period of cooling of the sensor and not during a period of heating. The ambient temperature can be measured accurately with the aid of a specialized detector.

According to the invention, a decrease in temperature below a constant and accurately known initial value $T_o$ is measured by means of an appropriate adjustment of the preheating needed to establish this temperature in the sensor. Since the changes in the temperature of the sensor during the measurement are small, the dynamics of the measurement are much less dependent on ambient temperature; this permits the centering of these dynamics to be optimized and, consequently, optimum sensitivity and accuracy to be obtained.

Furthermore, the device according to the invention employs a constant voltage source which is less costly and more accurate than a constant current source.

The analog-digital converter is employed in a relative mode based on its reference voltage, and this makes it possible to obtain an accuracy which is superior to that which would be obtained in an absolute mode.

The converter reference voltage, the constant voltage $v$ source and the series resistor $R_2$ are involved only in the determination of the temperature $T_o$ and not in the term $M_o/M$ which enables the level to be calculated.

The measuring device according to the invention also has the advantage of permitting the sequencing of a number of measurements, and this is not possible with the heating devices of the type of those described in the abovementioned French patents.

Obviously, the invention is not limited to the embodiment described and shown above. It extends, for example, to a device which makes it possible to determine the position of the surface separating two immiscible liquids, provided that they have different heat conductivities.

It also extends to a simplifed device enabling the position of the free surface of the liquid to be determined in relation to one or more discrete levels in order to indicate, for example, that the liquid reaches a maximum or minimum level in the vessel. A device of this kind may comprise an optical or sound indicator actuated by the control and computing unit.

I claim:

1. Process for measuring the level of the free surface of a liquid contained in a storage vessel and having a heat conductivity which is different from that of the medium situated above this free surface, by means of a hot wire sensor whose electrical resistance varies greatly with the temperature, this sensor being arranged so as to be cooled by the liquid to a greater or lesser degree as a function of the level of its free surface, comprising the steps of
   (a) heating the sensor to a predetermined temperature (To) by a Joule effect by being supplied with a constant voltage supply,
   (b) measuring the current (Io) flowing in the sensor at the instant when the temperature (To) is reached,
   (c) switching off the supply to the sensor at this instant,
   (d) switching on the supply to the sensor at the end of a predetermined cooling time interval measured from the instant of the switching off of the supply,
   (e) measuring the current (I) flowing in the sensor at the end of this time interval, and then
   (f) computing the level of the liquid from the values of (I) and (Io).

2. Process according to claim 2, wherein the step of computing includes the step of measuring the temperature of the liquid correcting the liquid level as a function of this temperature.

3. Process according to either of claims 1 or 2, wherein the current in the sensor is measured by determining the voltage at the terminals of a resistor placed in series with the sensor.

4. Process according to any one of the preceeding claims, where in the step of computing reference is made to a sensor response curve in order to compute the level of the liquid.

5. Device for making use of the process according to claim 1, comprising a hot wire sensor (1) supplied by a voltage $(+V_o)$ source, a circuit (7) for stabilizing the voltage at the terminals of the sensor, comprising
   a control and computing unit (4) having
      a first means for controlling the preheating of the sensor by a Joule effect to a temperature (To), and for switching off the supply to the sensor at the instant when this temperature is reached, and for switching on this supply at the end of a predetermined cooling time interval,
      a second means for measuring a parameter which is a function of the current flowing in the sensor, at two instants forming the bounds of the cooling time interval, and
      computing means responding to said two measurements for deducing the liquid level therefrom.

6. Device according to claim 5, wherein the voltage stabilizer circuit (7) comprises means (11, 12, 13, $T_1$) for bringing the voltage at the terminals of the sensor under the control of a reference voltage.

7. Device according to claim 6, wherein said means comprises an operational amplifier (11) for controlling a first transistor ($T_1$) placed in the supply circuit.

8. Device according to claim 7, additionally including another transistor ($T_2$) controlled by control and computing unit (4) for polarizing said first transistor ($T_1$) to switch the supply to the sensor on or off.

9. Device according to claim 5, wherein said second means includes a resistor placed in series with the sensor and an analog-digital converter whose input is connected to the terminals of said resistor and whose output (9) supplies said control and computing unit (4) with a digitized signal representing the current in the sensor.

10. Device according to claim 9 wherein said analog-digital converter supplies said control and computing unit with digitized values which are functions of the relationship between its input voltage and a reference voltage.

11. Device according to claim 9, wherein the control and computing unit comprises a memory loaded with a sensor response curve, to produce a measurement of the liquid level from the ratio Mo/M, where Mo and M are the numbers corresponding to the digitized signals supplied to said control and computing unit by said analog-digital converter, at said two bounds of the cooling time interval.

12. Device according to either of claims 5 or 9, additionally includes a detector (6) sensitive to the temperature of the liquid (Ta) for supplying said control and computing unit (4) with a signal required for computing a correction to the measurement of the liquid level.

13. Device according to claim 12, wherein said control and computing unit comprises a memory storing a correlation between the various values of said signal (Ta) and the corresponding values of the correction.

14. Device according to claim 12 wherein said control and computing unit computes a term representing the level of the liquid, of the form:

$(T-Ta)/(To-Ta)$ where To and T are the temperatures of said sensor at the start and at the end of the cooling period, respectively.

15. Device according to claims 5 or 9 or claim 11 additionally including an optical or sound indicator of the position of the free surface of the liquid, controlled by said control and computing unit (4).

* * * * *